(12) United States Patent
Schmidt et al.

(10) Patent No.: US 8,414,743 B2
(45) Date of Patent: Apr. 9, 2013

(54) METHOD AND DEVICE FOR THERMALLY DISINTEGRATING A STARTING MATERIAL USING FOREIGN PARTICLES

(75) Inventors: Alfons Schmidt, Delbrück (DE); Hans-Jürgen Sickelmann, Karlsruhe (DE); Armin Grob, Paderborn (DE)

(73) Assignee: Gebr. Lodige Maschinebau GmbH, Paderborn (DE)

( * ) Notice: Subject to any disclaimer, the term of this patent is extended or adjusted under 35 U.S.C. 154(b) by 0 days.

(21) Appl. No.: 12/600,536

(22) PCT Filed: Apr. 30, 2008

(86) PCT No.: PCT/EP2008/055370
§ 371 (c)(1),
(2), (4) Date: Nov. 17, 2009

(87) PCT Pub. No.: WO2008/145474
PCT Pub. Date: Dec. 4, 2008

(65) Prior Publication Data
US 2010/0147670 A1    Jun. 17, 2010

(30) Foreign Application Priority Data
May 25, 2007   (DE) .......................... 10 2007 024 706

(51) Int. Cl.
*C10B 47/00* (2006.01)
*C10B 55/02* (2006.01)

(52) U.S. Cl. ................ 201/12; 201/10; 201/21; 201/25; 201/31; 201/32

(58) Field of Classification Search .................. 201/205, 201/10, 4, 21, 25, 12, 31, 32; 585/240; 202/117, 202/118, 133, 136
See application file for complete search history.

(56) References Cited

U.S. PATENT DOCUMENTS

| | | | |
|---|---|---|---|
| 1,712,082 A | 5/1929 | Koppers | |
| 3,616,266 A * | 10/1971 | Hall et al. | 202/118 |
| 3,841,994 A | 10/1974 | Wunderlich et al. | |
| 4,210,491 A * | 7/1980 | Schulman | 201/2.5 |
| 4,280,879 A * | 7/1981 | Taciuk | 202/100 |

(Continued)

FOREIGN PATENT DOCUMENTS

| | | |
|---|---|---|
| DE | 508566 C | 9/1930 |
| DE | 932789 C | 9/1955 |
| DE | 1101113 B | 3/1961 |
| DE | 20103293 U1 | 11/2001 |
| DE | 10212104 A1 | 9/2003 |
| EP | 1016451 A1 | 7/2000 |

(Continued)

OTHER PUBLICATIONS

International Search Report for PCT/EP2008/055370, completed Nov. 6, 2008.

*Primary Examiner* — Nina Bhat
(74) *Attorney, Agent, or Firm* — Barnes & Thornburg LLP

(57) ABSTRACT

A method and a device for the thermal decomposition of an initial material, in particular, for the decomposition of meat and bone meal, oil sludges, for example, from cleaning tankers, autofluff (also called autofluffy), basic glycerin, for example, from biodiesel production, paint sludges from paint shops, contaminated soils, coated wood, and plastics such as plexiglass. According to the present method, organic initial materials are thermally decomposed very completely in nearly all cases. The very complete decomposition is achieved by adding foreign particles such as metal spheres to the initial material which is being thermally decomposed.

20 Claims, 2 Drawing Sheets

U.S. PATENT DOCUMENTS

| | | | | |
|---|---|---|---|---|
| 4,304,609 A | * | 12/1981 | Morris | 134/19 |
| 4,401,553 A | | 8/1983 | Faudel | |
| 4,563,246 A | * | 1/1986 | Reed et al. | 202/100 |
| 4,724,777 A | * | 2/1988 | Reed et al. | 110/246 |
| 6,172,271 B1 | * | 1/2001 | Horizoe et al. | 585/241 |

FOREIGN PATENT DOCUMENTS

| | | |
|---|---|---|
| EP | 1314770 A1 | 5/2003 |
| GB | 268613 | 4/1927 |
| RU | 2260615 C1 | 9/2005 |
| WO | WO2005/068908 A1 | 7/2005 |

\* cited by examiner

METHOD AND DEVICE FOR THERMALLY DISINTEGRATING A STARTING MATERIAL USING FOREIGN PARTICLES

CROSS REFERENCE TO RELATED APPLICATIONS

This application is the U.S. national phase of PCT/EP2008/055370 filed Apr. 30, 2008. This application claims benefit to 371 application PCT/EP2008/055370, filed Apr. 30, 2008. PCT/EP2008/055370 claims benefit under the Paris Convention to DE 10 2007 024 706.2 filed May 25, 2007. The disclosures of both of DE 10 2007 024 706.2 and PCT/EP2008/055370 are hereby incorporated herein by reference.

The invention relates to a method and a device for the thermal decomposition of an initial material, in particular for the decomposition of meat and bone meal, oil sludges, for example from cleaning tankers, autofluff (also called autofluffy), basic glycerin, for example from biodiesel production, paint sludges from paint shops, contaminated soils, coated wood, plastics such as plexiglass. According to the present method, organic initial materials are thermally decomposed in nearly all cases.

Therefore, the present invention in particular pursues the aim of being able to thermally decompose hazardous waste in a suitable manner and thus dispose of it suitably. Hazardous waste is a waste substance having dangerous features, thus posing a possible hazard to health or the environment. In many countries, exacting requirements are made for the technical systems, the methods used and the documentation and whereabouts of the hazardous waste as regards their disposal.

In the European Community alone, for example, several million tons of meat and bone meal are produced annually, which have to be disposed of. Using meat and bone meal as animal feed is now prohibited because of the danger arising from BSE. Its use as a fertilizer is not possible for comparable reasons.

For disposal, meat and bone meal is presently used as secondary fuel, for example, in the cement industry. The cement industry demands and receives payments for this kind of disposal of meat and bone meal. The use of meat and bone meal as a substitute fuel is disclosed by WO 2005/068908. That meat and bone meal is at the moment mainly disposed of by refuse incineration is described in DE 201 03 293 U1.

From DE 102 12 104 A1, a method for recycling meat and bone meal is known in which meat and bone meal is decomposed in a metal bath, for example a tin bath or zinc bath, at a temperature of the metal bath of between 250° C. and 450° C. by pyrolysis in a reactor. The toxicity of the liquid metal poses a problem. In addition, the method is complex.

In the prior art, a pyrolysis method, i.e. a thermal decomposition under exclusion of oxygen, is usually carried out on a large scale in a vertical reaction system. A vertical reaction system comprises a silo-shaped, externally heated vessel and a mixing tool provided close to the bottom. What is problematic in such a system is that the product bed at first comprises only solids and that thus, solid initial materials must be stirred. In such cases, the required movement of the products is difficult. Insufficient movement of the product leads to insufficient heat transfer. The heat must come to the solid initial material through the walls of the silo-shaped container, which in the case of insufficient movement of the product only works slowly. A 100 percent decomposition of meat and bone meal can thus scarcely be ensured or only with an unacceptable amount of time involved. The remaining solid residues are not free from harmful contaminants with a level of safety high enough so that they may, for example, be used as soil conditioners. Addition of toxic heavy metals during decomposition creates further problems with regard to disposal. Furthermore, decomposition can only be carried out batchwise. A continuous or quasi-continuous operation is not possible. The method takes a lot of time also for this reason, and is therefore uneconomical.

In order to be able to carry out large-scale pyrolysis continuously, initial materials in the prior art are fed to a rotating drum or a rotating pipe. The product bed is circulated during rotation in order to provide for a good thorough mixing, as is known, for example, from printed publication WO 2005/068908. The drum or pipe is heated externally, generally from underneath by means of gas burners. The feed of the initial material is carried out via one end of the drum. At the other end of the drum, the solids created are extracted from the product bed in the downward direction, and the created gaseous substances in the upward direction. Condensable components in the gas are then separated by condensation.

In such a continuous method it is particularly problematic to ensure that the meat and bone meal is really decomposed completely. Thus, it may happen that the solids resulting from the decomposition still contain undecomposed meat and bone meal. Problems in connection with the disposal of meat and bone meal cannot be solved in this manner. In addition, thermal overheating may occur in the above-described continuous method when the drum is heated with gas burners from underneath. Furthermore, it is technically difficult to ensure an exclusion of oxygen in the drum due to the feeds and drains and the rotation of the drum.

In the aforementioned prior art it is an additional problem that the decomposition products are at least in part sticky at first and that agglomerations and deposits are created on wall surfaces, as is known from WO 2005/068908. This additionally impedes the required thermal transfer and thus, pyrolysis. Ensuring a complete thermal decomposition is difficult.

From EP 1 314 770 B1, an electrically heated fluid-bed reactor or horizontal mixer for pyrolysis of meat and bone meal is known. A sufficiently complete decomposition of meat and bone meal cannot be ensured by this teaching, for example, in order to recycle the decomposition products as soil conditioners. Thus, agglomerations created during pyrolysis also in this case affect the reliability of the intended decomposition.

Comparable problems occur with respect to the further organic initial materials mentioned at the beginning when they are to be decomposed.

A heated furnace for low-temperature coking of fuels is known from DE 508 566. In a rotating heated drum, there are heated steel spheres of such a size and weight that the fuel is broken only to a certain degree. A complex device in the furnace such as a worm, blade shaft or rake is supposed to be avoided in this way. How hazardous waste whose disposal is problematic can be thermally decomposed in a reliable and complete manner, such that a very much more expensive different disposal of hazardous waste is not needed anymore, does not become apparent from this printed publication.

Printed publication DE 932 789 discloses a method for degassing powdered or fine-grain fuel in a mixing worm. The thermal energy required for degassing is supplied by the fuel being filled into the worm together with heated powdered or fine-grain heat carriers, which for example consist of metal. The method known therefrom is neither intended nor suited for thermally decomposing hazardous waste reliably to such a complete degree that a different expensive disposal can be omitted.

The object of the invention is providing a method whereby a desired thermal decomposition on a large scale is accomplished in an improved manner, in particular a thermal decomposition of hazardous waste such as, for example, meat and bone meal. In addition, a device for carrying out the method is to be provided by the invention.

In order to solve the object, foreign particles which are not thermally decomposed and also not liquefied are introduced into the product bed or the mixing material. Due to the movement, the addition of the foreign particles prevents larger agglomerations from forming during pyrolysis in the product bed or the mixing material. In addition, the foreign particles provide for deposits on the walls of the container in which the pyrolysis is carried out being loosened again. In this way, a reduction of agglomerations and deposits and thus the improvement of the thermal transfer within the product bed is accomplished. Thermal decomposition therefore proceeds correspondingly faster and more completely. Foreign particles are particles that are different from the initial material and the decomposition products or the intermediate products which may possibly occur. Foreign particles within the sense of the present invention are mainly spheres consisting of metal.

The size of the foreign particles preferably is to be selected so that the grain size differs from the grain size of the solids resulting from the thermal decomposition is such a way that the foreign particles can be separated from the solids resulting from the thermal decomposition by screening. The solid resulting from the thermal decomposition can thus be freed from the foreign particles in a particularly simple manner. As a rule, the solid created during the pyrolysis is present in the form of very finely powdered ash. A diameter of 1 to 2 mm has proved to be of value in order to be able to screen the foreign particles immediately when removing the solids from the pyrolysis container.

The material of the foreign particles is preferably selected such that it behaves inertly with regard to the respective initial material and with regard to the decomposition products so as not to contaminate the products resulting from the thermal decomposition and to ensure the obtaining of the foreign particles.

Preferably, the foreign particles consist of a material that conducts heat well, preferably of metal. However, materials such as, for example, quartz sand or ceramic granules may also be used. By providing materials with a good heat conductivity, an improved thermal transfer during pyrolysis, i.e. during thermal decomposition, is achieved. The foreign particles absorb heat from the walls of the container and release this heat again within the product bed over a thus increased surface. As a result, the heat transfer is significantly improved over the prior art. Decomposition is thus accelerated significantly. Passing through unwanted phase transitions such as, for example, plastic or tough consistency is at least considerably reduced. Initial materials are thermally decomposed correspondingly faster, more uniformly and more completely.

In many cases, steel is suitable for meeting the various requirements for the material of the foreign particles, that is to provide a sufficiently good heat conductivity on the one hand, and on the other, to behave inertly with regard to the initial material and the decomposition products. A stainless steel or appropriate lye-resistant and acid-resistant special steels are to be preferred if an acid or a lye are produced during decomposition. The mechanical stability of steel is also suitable to behave in a mechanically sufficiently stable manner.

The foreign particles preferably have a diameter of a few millimeters, primarily of a maximum of 8 mm, preferably of no more than 4 millimeters. In addition, the foreign particles preferably have a minimum size of 0.5 mm, particularly preferably of at least 1 mm. The desired mechanical and heat-conductive effects can be obtained particularly well with particles of this size. As a rule, an upper limit of 8 mm should not be exceeded in order to avoid mechanical damage. Diameters that are too large lead to worse results as a matter of principle. Diameters of the foreign particles that are too small may lead to a separation from the solid decomposition products being difficult to achieve.

In one development of the method, solids created by thermal decomposition are utilized in order to feed them into the product bed in addition to the foreign particles, together with the initial material, in order to achieve the above-mentioned mechanical and/or thermal effects. This may aid the method according to the invention.

Preferably, pyrolysis, i.e. the thermal decomposition, is carried out under exclusion of oxygen with or in a horizontal mixer. In this manner, a fluidized bed is mechanically generated during pyrolysis. Compared with pyrolysis in a rotating pipe, fluidization occurs, and not merely a circulation. Due to this fluidization, the heat transfer from the wall into the product bed is improved on the one hand, and a temperature gradient within the bed is avoided. On the other hand, the initial materials, foreign particles and produced products are better intermixed. Thus, a more homogeneously distributed pyrolysis takes place. This ensures in an improved manner that the removed products are actually completely thermally decomposed. Thus, no thermally non-decomposed initial materials remain in the products. It is also easier, compared with a rotating pipe, to ensure the exclusion of oxygen because the container of the horizontal mixer is not moved, unlike the rotating pipe. Therefore, gas-proof connections can be provided more easily.

In a development of the invention that is improved further, a ploughshare mixer known, for example, from the printed publication "Lebensmitteltechnik", No. 2, page 66-74, 5th volume, 1973, is used as a horizontal mixer. Thus, a fluidized bed is generated in a further improved manner.

In a further improved embodiment of the invention, a horizontal mixer is used which comprises centrifugal blades arranged close to the wall and returning plates arranged close to the axis, in particular, when the initial materials and thus the mixing material are particularly coarse. Given an appropriate rotation of the centrifugal blades and the returning plates, the mixing material is transported away from the outer wall in the direction of the axis of the mixing tool by the centrifugal blades. The returning plates convey the mixing material in the direction of the outer wall or in the direction of the centrifugal blades. This ensures, in a more improved manner, the desired thorough mixing of the mixing material, thus yielding a more improved result, in which the completeness of the decomposition is ensured in an improved manner. Decomposition can also be carried out particularly fast. A very fast decomposition is essential with regard, for example, to the decomposition of potassium soap in biodiesel residue, as experiments which have been carried out show. Otherwise, disadvantageous phases of toughness may occur. Especially in the case of coarse mixing material the use of such a horizontal mixer is more advantageous. Such a mixer is known, for example, from printed publication EP 1016451 A1.

For comparable reasons, a mixer is employed as it is known from printed publication DE-AS 1101113. Two differently arranged groups of blades convey in opposite directions, which is particularly advantageous in the case of coarse mixing material, and which furthermore is gentle on the product.

In one embodiment, the horizontal mixer comprises knife heads that serve the purpose of cutting up the mixing material during pyrolysis. This can further promote thermal decomposition.

The cylindrical jacket of the container in which pyrolysis is carried out preferably is heated over its entire surface, in particular electrically. Thus, the jacket is brought to the respective desired temperature in a uniform manner. It is avoided in this manner that the mixing material, i.e. the initial material and the foreign material as well as decomposition products already produced, can be overheated locally.

A dome is preferably located on top of the container, via which gaseous components are withdrawn and which serves as a settling zone for the ash particles of the indecomposable pyrolysis residue, which often are very light. A carry-over of the ash particles is thus avoided. The jacket of the dome preferably is heatable, for example, by means of an externally controllable electric heating system or by other heating means. By heating the dome, a premature condensation of condensable components can be avoided.

For the same reasons, the pipe (also known as vapor outlet pipe) conducting gas to the condensers is preferably heated.

To further increase the efficiency of the method, the following steps are advantageous, both individually as well as combined.

First, foreign particles are filled into the container in which pyrolysis is carried out. A filling level of 5 to 20% has proved to be of value. Then, the foreign particles are heated up to the desired temperature for carrying out pyrolysis. Advantageously, this temperature is between 50 to 100° C. above the decomposition temperature of the initial material. Subsequently, particulate initial material is filled into the container and the mixing material is mixed. This way, decomposition of the initial material starts particularly quickly because heat is transferred immediately from the foreign particles onto the initial material. Agglomerations and deposits on walls are thus minimized from the start.

To adjust, monitor and control the temperature inside the container and to control the execution of the method dependent upon the temperature, the container for carrying out the pyrolysis expediently has one or several thermocouples or other suitable temperature measuring instruments in its interior.

The particulate initial material is now gradually fed to the mixing container, preferably controlled by the temperature variation inside the mixing container and/or the filling level of the mixing container. With regard to temperature, attention must be paid to keeping with the desired temperature range, which preferably is between 50 to 100° C. above the decomposition temperature of the initial material. With regard to the filling level, attention must be paid to it not exceeding the maximum. This maximal filling level, for example, amounts to 70% in order to ensure proper operation. If the particulate initial material is only fed gradually until a predetermined maximum filling level is been reached, this also ensures a quick and complete thermal decomposition in an improved manner. Alternatively or additionally, the further addition of initial material is controlled dependent upon the quantity which is thermally decomposed in the mixing container. In particular, the feed of the initial material is controlled so as to correspond to the pyrolyzed quantity in order thus to ensure the quick and complete thermal decomposition. An estimate as to what quantity is pyrolyzed in each case can be made, among other things, by means of the quantity of the gas produced and withdrawn, and/or by means of weight changes of the mixing container.

If a predetermined maximum filling level is reached, the feed of initial material is stopped, and one then waits until no gas can be withdrawn anymore in order to ensure that the contents of the mixing container, i.e. the mixing material, is pyrolyzed completely. Then, the solid inside the mixing container is removed, preferably in such a way that a filling level of 5 to 20%, particularly preferably of 10% remains. This creates good conditions for being able to start the further feed of initial materials immediately following the removal.

Removal can be carried out via a discharge device when the centrifugal device or the mixing tools are running.

During removal, foreign particles that differ from the solid created by the thermal decomposition, are screened out immediately and fed back to the mixing container, preferably together with the initial material. The quick and complete pyrolysis is also promoted in this manner.

An optimized exploitation of the resulting solid may comprise first using it as a fuel and then further using remaining, non-combustible residue, for example as a soil conditioner.

Gaseous decomposition products are continuously withdrawn during pyrolysis. They are then conducted through one or more condensers to separate condensable components as a whole or separately from the gas flow. Finally, the gas is preferably subjected to gas washing. Altogether, it is thus possible to obtain the various liquid or gaseous components in a usable form.

Where a part of the decomposition products sublimates, that is, does not form a liquid final phase, the separation occurs by condensation on the wall of a closed container equipped with a scraper in order to remove the sublimate from the wall and to collect it in the lower portion of the container, from where it can be discharged if necessary. In case the vapors, apart from the sublimating components, contain also such components forming a liquid upon condensation, thus wetting the sublimate in the settling container or even making it pasty, the settling container can be heated. The temperature must be controllable and is to be selected so as to be below the sublimation temperature, in any case, however, higher than the boiling temperature of the liquid phase. The condensation of this liquid phase then takes place in a downstream condenser with a suitable cooling system.

If, in the decomposition products produced as condensable vapors, compounds are contained which are produced in part as a liquid and in part as highly viscous substances during condensation at room temperature, it may be necessary to connect at least two condensers in series. The first one is operated at a temperature that prevents the highly viscous phase of the condensate. The collecting container for this condensate must also be heated so that the condensate can be discharged. In the second condenser, the remaining vapors are separated with liquids of a lower boiling temperature at a correspondingly lower temperature.

The decomposition gases that still arise after condensation must in many cases be freed from interfering compounds prior to further use. This gas cleaning is done by means of wet washing in which the gas is conducted through a suitable liquid absorbing the interfering substances. In some cases, gas cleaning can be done so that activated carbon is employed as absorbent.

In one embodiment, meat and bone meal is thermally decomposed. In the case of meat and bone meal, it is of particular importance that this is thermally decomposed as completely as possible in order to avoid problems with regard to BSE and other pathogens. Compared to the prior art, the complete decomposition is ensured in a significantly improved manner by the present method. Particularly with regard to the decomposition of meat and bone meal, there are legal requirements and strict inspections, their purpose being that solids obtained from meat and bone meal do not contain nitrogen residues anymore, which represent a gauge for insufficient decomposition. With the invention, it was accomplished that nitrogen residues could not be detected anymore in solid products following the thermal decomposition of meat and bone meal.

Because thermal decomposition is effected in a very uniform manner, an improved separation between the created products is furthermore effected compared with the prior art mentioned. Separation of the gaseous, liquid and solid products thus is particularly good, as checks have shown, among other things, on meat and bone meal, for example. The residue ash of meat and bone meal was examined. The nitrogen content was less than 0.01% by wt. Thus, this was lower than the detection limit. All regulations by the European Community in this regard were fulfilled. This was not possible in the prior art.

The thermal decomposition of meat and bone meal was carried out as follows in an example.

A horizontal mixer having a volume of 50 liters is used. The mixer has in its interior four mixing arms attached to an axis. The mixing arms comprise ploughshare-like centrifugal blades with returning plates in the above-described manner. The jacket of the horizontal mixer is electrically heated over its entire surface so that it is uniformly brought to temperature. The heating temperature is 650° C. In that case, the pyrolysis temperature is approximately 450° C.+/−20° C. The axis with the mixing tools is rotated at 60 revolutions/min. The length of the mixer is 400 mm, and the diameter is also 400 mm. There is a slightly diminished pressure of approx. 950 mbar. The mixer is operated in a quasi-continuous manner. The meat and bone meal is supplied to the mixer from a prefilling container by means of a metering worm. It is ensured, in the prefilling container, that there is always a certain amount of meat and bone meal above the worm. This way, it is ensured that no oxygen enters the mixing container. Iron spheres having a diameter of 2 to 4 mm are used as foreign particles. First, the mixing space is filled with iron spheres to approx. 10% of its volume. A total of 25 kg iron spheres is used. After the spheres have reached the pyrolysis temperature, the mixer is supplied with meat and bone meal via the prefilling container.

The horizontal mixer is placed on a scale during operation. By means of weight changes thus measured, it is checked that the respectively desired filling level is not exceeded, because the weight change is a measure for the filling level.

The mixer is fed with 35 kg meat and bone meal within 5 hours; 7 kg/hour are supplied. Close to an end wall of the mixer, the gas produced by the decomposition is continuously discharged in an upward direction and thus withdrawn. The solid produced by pyrolysis at first remains in the mixer. If a filling level of 70% is reached in the mixer, pyrolysis is continued until no gas can be withdrawn anymore. This ensures that also the meat and bone meal that was the last to be supplied is completely decomposed. Then, the pyrolysis is stopped and the solid is withdrawn in the downward direction with the exception of a filling level of 10%.

Preferably, produced gases and solids are withdrawn at an end face of the mixing container of the horizontal mixer which is opposite to the side through which the initial materials are transported into the container. If the solids are not withdrawn completely and the produced gas is discharged from the container in an upward direction, this ensures in a further improved manner that only completely decomposed products can be withdrawn.

A residual amount of a mixture of iron spheres and the solid obtained from the meat and bone meal remains in the mixer in order to thus be able to continue pyrolysis immediately. The iron spheres have a good heat conductivity within the meaning of the invention, in contrast to the solids produced during the thermal decomposition of meat and bone meal.

The spheres are screened out from the solid withdrawn and are preferably added again to the prefilling container. In this manner, the meat and bone meal located in the prefilling container is slightly pre-heated again, and pyrolysis is thus further promoted.

The ash resulting from the meat and bone meal consists of carbon and inorganic components such as calcium oxide, calcium carbonate, sulfates and nitrates. After the above described decomposition has been carried out, the ash is completely free from organic components.

In a further embodiment of the invention, independent from the hitherto described method, the ash obtained from meat and bone meal is burned, for example at 750° C. The carbon of the ash burns in the process. What remains are the inorganic components of which excellent further use can be made, among other things, as soil conditioners.

The gas produced during the decomposition of the meat and bone meal is first freed from condensable gas components by condensation and then conducted through a solution of sulfuric acid in order to thus free the remaining gas from ammonia. The result of this is an excellently combustible gas.

The gas obtained comprises methane, ethane, butane, etc. The gases are used, for example, for combustion in power plants. The remaining condensate is a heavy oil which can, for example, be burned in tank engines. Thus, an exploitation of all decomposition products of meat and bone meal is successful without any health concerns remaining.

The method is used primarily also in plastics recycling of plastics mixtures. Plastics mixtures are broken down again into their initial chemical substances. Subsequently, the individual pure basic plastics can be produced again from these initial substances. According to the prior art, such plastics mixtures were hitherto shredded first and then melted. Use of these plastics mixtures reused according to this method was not permitted for food packaging. They could only be used for the production of park benches etc. The plastics recovered according to the method according to the invention now can also be used in the food industry. From new goods consisting of mixed plastics, the same new goods can thus be produced again. Recycled goods, such as park benches, need not be produced from reprocessed plastics.

Incidentally, the final products produced from plastics can also used for energy production.

This method is particularly well-suited for plastics mixtures and not for type-specific plastics because type-specific plastics can be better recycled in another manner. At present, this poses some problems in the case of plastics mixtures. The present invention thus solves a special problem concerning plastics mixtures, even if, from technical standpoint, it can be applied in the same way in type-specific plastics.

The method was tested by thermally decomposing oil sludges, basic glycerin from biodiesel production, paint sludges, contaminated soils, coated wood and various plastics mixtures. A much more complete thermal decomposition compared with the prior art was always achieved successfully. Therefore, this allows the conclusion that organic initial materials can be thermally decomposed in an improved manner in accordance with the present method.

The method is environmentally friendly. This can bring relief to waste disposal sites. As a rule, the method proceeds in an energetically neutral manner. The energy that must be expended for the pyrolysis method is recovered more or less.

BRIEF DESCRIPTION OF THE DRAWINGS

FIG. 1 schematically shows a horizontal mixer 1 with a rotatably supported, horizontal axis 2. Centrifugal blades 3 close to the wall and returning plates 4 close to the axis are attached to the axis 2 via arms 5. Given an appropriate rotation of the axis, the centrifugal blades 3 convey mixing material located in the container in the direction of the axis, and the returning plates convey the mixing material back in the direction of the axis 2. The mixer 1 has electrical heating elements 6 that extend over the entire jacket surface of the mixing container. Thus, the jacket surface is heated completely. A prefilling container 7 is connected with an end wall 9 of the mixer 1 via a pipe 8. A particulate initial material can be introduced into the prefilling container with or without foreign particles. The initial material is then transported into the mixer by means of a conveyor screw 11. In the process, attention must be paid that filling does not fall below a fill height 10 in the prefilling container so that the conveyor screw 11 is always completely covered.

Figure 1:
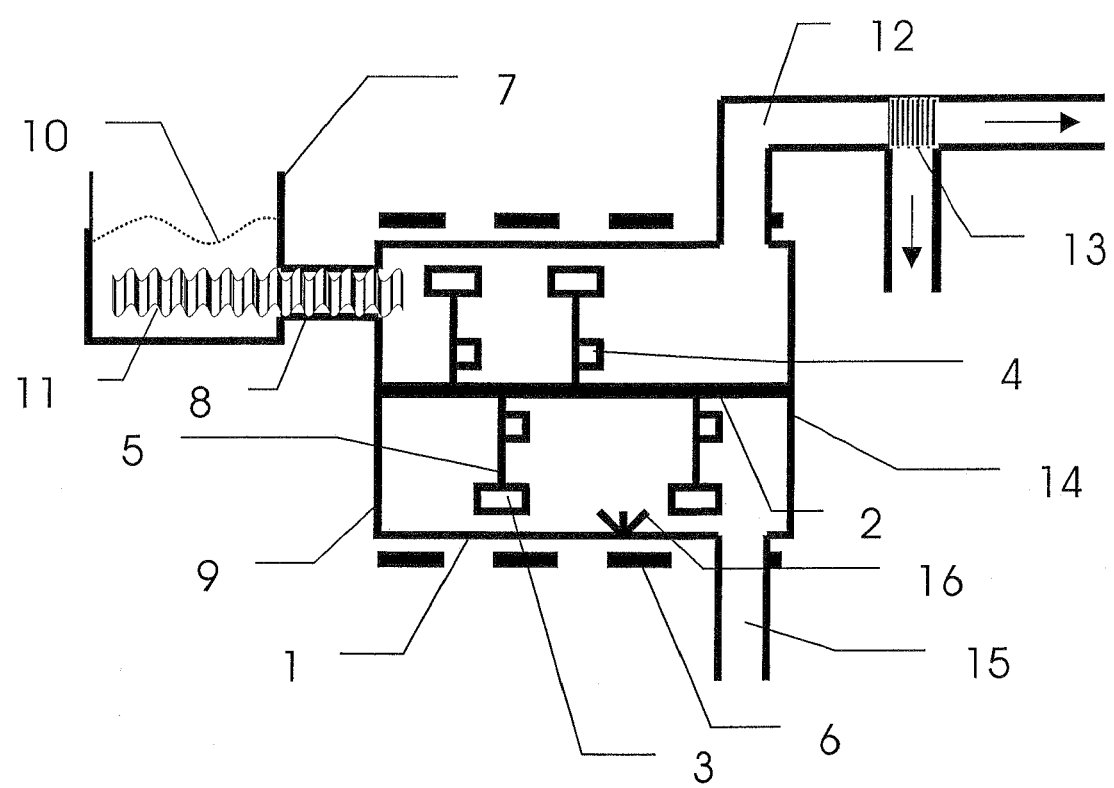
FIG. 1 illustrates schematically a horizontal mixer for carrying out the method; and, FIG. 2 illustrates schematically another apparatus for carrying out the method.

The initial material is then thermally decomposed in the horizontal mixer in the manner described. As described, produced gas is withdrawn, close to the opposite end wall, in the upward direction through a pipe 12. Condensable components are then separated from the gas by a condenser 13 and discharged in a downward direction. Non-condensable gas components are conducted on to the right and subjected to further processing.

Solids produced by thermal decomposition are withdrawn, as described, through a pipe 15, leading in a downward direction, which is arranged close to the other end wall 14. A knife head 16 may be attached to a wall in order to counteract a formation of agglomerations.

It is easier in a horizontal mixer as compared to a rotating pipe to ensure the necessary exclusion of oxygen during pyrolysis.

Figure 2:
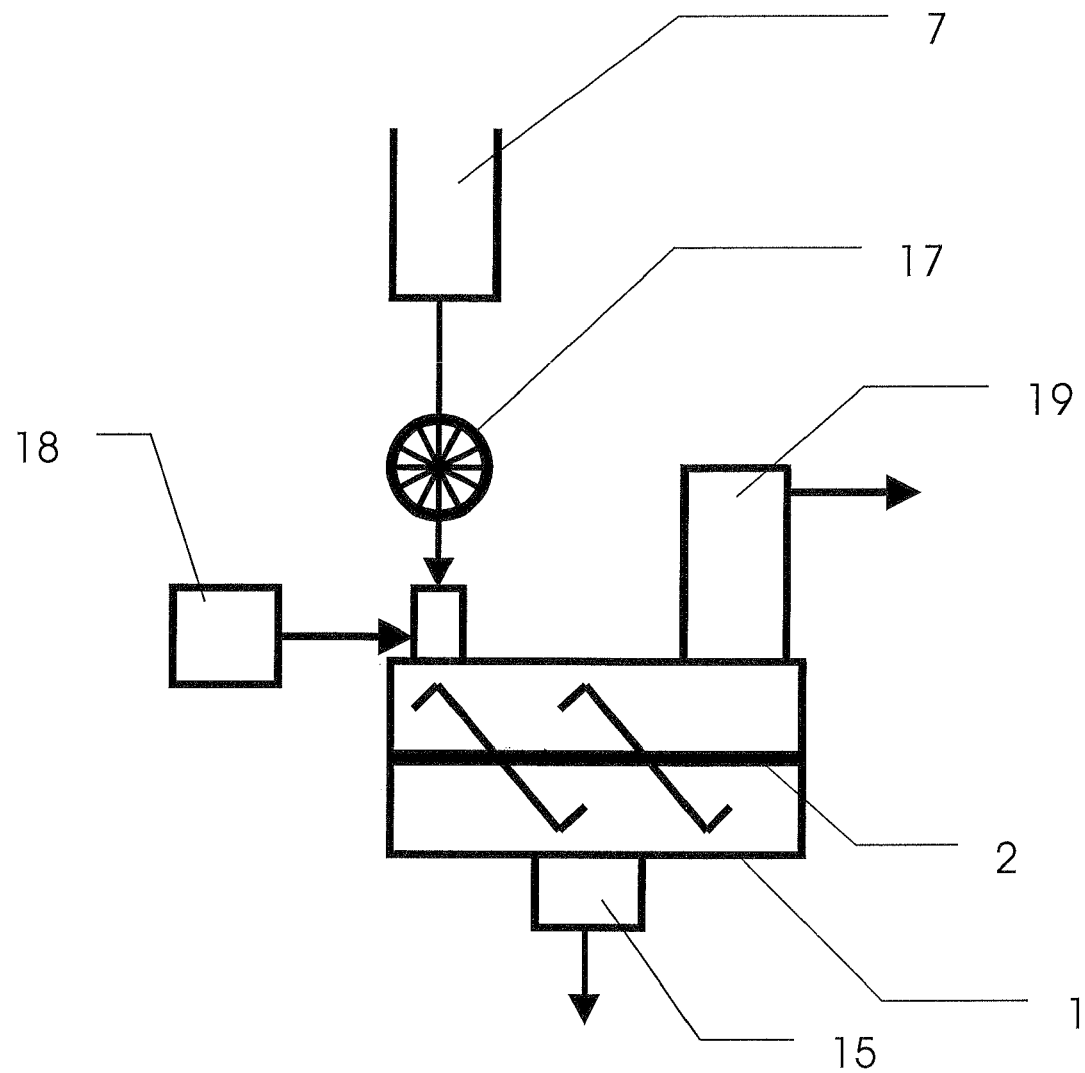

FIG. 2 schematically shows another embodiment of a device for carrying out the method. In this case, a rotary feeder 17 is used instead of a worm in order to supply initial materials from the prefilling container to the horizontal mixer 1 driven by gravity in a controlled manner. In addition, there is an inert gas supply 18 which is arranged in such a way that the inert gas enters the mixer 1 together with initial materials, which can be advantageous if there is an explosion hazard. A dome 19 serves as a settling zone, so that ash and the like does not enter the gas outlet.

With the invention, food, abattoir waste, livestock meal, fish meal, plastics, elastomers, products of rubber and natural rubber, wood, paper, tissue, biodegradable residual products, heavy oils or their residues, as well as waste mixtures from the aforementioned products can be thermally decomposed completely.

In another embodiment of the invention, polymetacrylate waste, that is, Plexiglass® was pyrolyzed. Pyrolysis was carried out with a horizontal mixer by the company Gebrüder Lödige Maschinenbau GmbH, Paderborn, Germany, which is commercially available under the designation VT20. The number 20 denotes the volume of the mixer, i.e. a mixer volume of 20 liters. The mixer drum was electrically heated from the outside. During the entire experiment, the rotational speed of the centrifugal mechanism was 100 rpm. First, 11.5 kg iron spheres having a diameter of 0.5 mm to 1.0 mm were filled into the horizontal mixer. A slight vacuum was applied to draw off a decomposition condensate produced. After the metal spheres had reached a temperature of approx. 470° C., 100 grams polymetacrylate waste, respectively, was added under a nitrogen atmosphere, in intervals of one minute, respectively. In the process, the product temperature was not allowed to drop under a value of 350° C. for the pyrolysis to progress in an optimal manner. In order to ensure the desired pyrolysis temperature of 470° C. on the inside, a temperature of approx. 600° C. was applied on the outer surface of the drum. It was found, by means of the quantity of condensate withdrawn, that the decomposition progressed in a complete manner within the time the addition was carried out. Since practically no solids are produced in the pyrolysis of plexiglass, neither solids nor metal spheres were withdrawn during the experiment. The vapor was drawn off and condensated for withdrawing the decomposition condensates produced. Very pure metacrylic acid was obtained as a condensate. The condensate obtained was so pure that it could subsequently be used for polymerization without any further treatment. Thus, for example, it was possible to produce technical plexiglass from the metacrylic acid obtained. 2,100 grams of plexiglass were added in the 32-minute experiment. 1,740 grams of condensate were obtained. The difference in weight was the result of solid residues.

A pyrolysis of plexiglass would not have been possible in the described manner without the use of the spheres. Otherwise, plastic fusing would have occurred which would have been scarcely controllable.

In another embodiment of the invention, a pyrolysis of x-ray film cuttings was carried out, that is, shredded x-ray films as they are produced in medicine. A commercially available horizontal mixer DVT50 by the company Lödige was used, i.e., a mixer having a mixing volume of 50 liters. The drum of the mixer was electrically heated and totally heat-insulated. During the experiment, the rotational speed was 45 rpm continuously. The heating temperature was 650° C. Nitrogen was continuously fed into the vapor outlet of the horizontal mixer for the purpose of inerting. In total, 25 kg steel spheres having a diameter of 1.4 to 2.0 mm were filled into the mixer and heated to 450° C. Subsequently, the shredded x-ray films were added in portions of 2.0 liters and in intervals of 5 minutes over a down pipe having a manually operated lid, that is, a total of 9.1 kg shredded x-ray film was added within 75 minutes. For safety reasons, the pyrolysis was continued for 30 minutes after the addition of shredded x-ray film had been completed. Subsequent to pyrolysis, the content of the horizontal mixer was cooled down to 40° C., and the cooled solids were withdrawn in a downward direction. The spheres were screened out. The result was 1 kg of carbon with a metallic silver fraction.

The mixer comprised a cooled separator container with a dip pipe. The volatile products produced during pyrolysis were continuously supplied to this cooled separator container with dip pipe. The volatile components sublimated in the separator container. 2 kg of slightly moist material was produced until the end of the experiment, which substantially consisted of terephthalic acid with entrained carbon. Except for slight deposits on the blade arms of the mixing tools of the horizontal mixer, the inside of the horizontal mixer and the heated vapor pipe were free of product deposits.

The moisture in the product in the separator container was a condensate that could be separated because of an appropriate temperature control.

Instead of having to dispose of the x-ray film waste at relatively high expense, terephthalic acid was obtained with the method according to the invention, which could, for example, be used for the manufacture of new x-ray films. The silver could be separated in a conventional manner from the carbon silver mixture. Pure metallic silver was thus obtained.

Fluff was pyrolyzed in another exemplary embodiment, i.e. car parts with the exception of body sheet metal and other larger, easily separable metallic car parts. Again, a horizontal mixer DVT50 by Lödige was used whose drum was electrically heated at 500° C. The rotational speed of the centrifugal mechanism was 37 rpm. 25 kg of metal spheres were added and heated at first to 400° C. Inerting with nitrogen was carried out as in the above-mentioned experiment. Again, the diameter of the steel spheres was 1.4 to 2.0 mm.

After the metal spheres had reached a temperature of 400° C., a total of 3.0 kg fluff was filled into the mixer within 3 minutes. After 24 minutes, a small amount of condensate was detected in the course of the next six minutes. Pyrolysis was carried out for another 15 minutes for safety reasons, in order to ensure the completeness of the pyrolysis. When the experiment had ended, the mixer was cooled down until the products on the inside had a temperature of less than 40° C.

Condensate was withdrawn in short intervals during the entire experiment. The result was 0.57 kg pyrolysis condensate having a density of 0.98 kg/l. It was oil that had been produced during the decomposition. A solid residue of 1.65 kg remained in the mixer, which also contained components of metals. The rest was gaseous, but could yet contain components that could be liquid at a lower condensation temperature. On the whole, combustible material in the form of oil and gas was obtained. The residue did not constitute hazardous waste anymore. A much more expensive disposal of the hazardous waste "fluff" could therefore be avoided according to the invention.

In another exemplary embodiment, a pyrolysis of wood was carried out. It is imperative in the pyrolysis of wood that the pyrolysis is carried out very quickly with regard to time (flash pyrolysis) so as to obtain a high-quality wood oil. To this end, the wood used must be present in as small pieces as possible. Furthermore, the pyrolysis temperature must always be between 460 and 480° C.

25 kg iron spheres of a diameter of 1 to 1.5 mm were added to a horizontal mixer DVT 50 by the company Lödige, whose mixing drum was electrically heated to 600° C., and whose rotational speed of the centrifugal mechanism was 90 rpm.

After the spheres had reached a temperature of 490° C., 0.6 kg of wood granules (0.5 to 4 mm grain size) were added. Due to the amount of cold wood and the incipient decomposition, the product temperature dropped to 460° C., only to reach the value of 485° C. again after 5 minutes. 0.6 kg of wood granules was thus added to the pyrolysis process in intervals of 5 minutes, respectively.

The gas forming during pyrolysis and the vapor were conducted over a water-cooled tubular condenser in which the vapor was condensed and collected in a storage vessel. The gas was burned off.

An amount of wood oil of 40% relative to the amount of wood used was obtained. The amount of gas obtained and the residual carbon was not measured.

In another exemplary embodiment, a pyrolysis of used tires was carried out.

A horizontal mixer by the company Lödige, whose mixing drum was electrically heated to 650° C., and whose rotational speed of the centrifugal mechanism was 90 rpm, served as the experimental device. 25 kg iron spheres of a diameter of 1 to 1.5 mm were added.

After the iron spheres had reached 560° C., 1 kg of shredded used tires were added. The size of the pieces of tire was 10×10×2 cm, maximally. After a residence time of the product of 10 minutes, no production of condensate could be detected anymore, which meant that the decomposition was completed. In the further course of the experiment, 1 kg of discarded tires, respectively, was added to the mixer every 10 minutes. During the entire experiment, the product temperature was between 540° C. and 560° C. No tough phase of the product was obtained in the entire duration of the experiment.

The vapors produced were separated in a water-cooled shell-and-tube condenser and collected in a collecting vessel. The pyrolysis gas was burned off. 29% of pyrolysis oil was obtained, relative to the amount of tires used. The residual product was present in a finely-powdered form in the mixing drum, and also contained the pieces of steel wire of the tire body.

The invention claimed is:

1. A method for decomposing an organic initial material into at least one of gaseous, liquid and solid products by pyrolysis, characterized in that an initial material is moved in a container of a horizontal mixer together with foreign particles during the thermal decomposition, with the material of the foreign particles being neither thermally decomposed nor liquefied during the pyrolysis, wherein initial materials are supplied to the container of the horizontal mixer continuously, the gases produced in the container during pyrolysis are withdrawn continuously, the supply of initial materials is stopped when a predetermined filling level of the container is exceeded, and subsequent to that, solids are partially withdrawn from the container as soon as no gas can be withdrawn anymore.

2. The method according to claim 1 wherein the initial material comprises at least one of: hazardous waste; meat; bone meal; oil sludge; autofluff; used vehicle tires; basic glycerin; paint sludges; contaminated soils; coated wood; and, plastic.

3. The method according to claim 1 wherein the container in which the pyrolysis is carried out is filled with foreign particles to at least 5%.

4. The method according to claim 1 wherein the foreign particles comprise at least one of iron particles and steel particles.

5. The method according to claim 1 wherein the foreign particles have a diameter of 0.5 mm to 5 mm.

6. The method according to claim 1 further comprising resupplying solids produced by thermal decomposition to the pyrolysis.

7. The method according to claim 1 further comprising transporting a particulate initial material by a worm from a prefilling container into the container of a mixer under the exclusion of oxygen, the transporting being controlled so that the worm is always covered completely by the initial material in the prefilling container.

8. The method according to claim 1 wherein the initial material comprises plastic or a plastic mixture, the method further comprising producing plastic from the products produced by the thermal decomposition.

9. The method according to claim 2 wherein the container in which the pyrolysis is carried out is filled with foreign particles to at least 5%.

10. The method according to claim 2 wherein the foreign particles comprise at least one of iron particles and steel particles.

11. The method according to claim 3 wherein the foreign particles comprise at least one of iron particles and steel particles.

12. The method according to claim 2 wherein the foreign particles have a diameter of 0.5 mm to 5 mm.

13. The method according to claim 3 wherein the foreign particles have a diameter of 0.5 mm to 5 mm.

14. The method according to claim 4 wherein the foreign particles have a diameter of 0.5 mm to 5 mm.

15. The method according to claim 9 wherein the foreign particles have a diameter of 0.5 mm to 5 mm.

16. The method according to claim 10 wherein the foreign particles have a diameter of 0.5 mm to 5 mm.

17. The method according to claim 11 wherein the foreign particles have a diameter of 0.5 mm to 5 mm.

18. The method according to claim 2 further comprising resupplying solids produced by thermal decomposition to the pyrolysis.

19. The method according to claim 3 further comprising resupplying solids produced by thermal decomposition to the pyrolysis.

20. The method according to claim 4 further comprising resupplying solids produced by thermal decomposition to the pyrolysis.

\* \* \* \* \*

UNITED STATES PATENT AND TRADEMARK OFFICE
CERTIFICATE OF CORRECTION

| | |
|---|---|
| PATENT NO. | : 8,414,743 B2 |
| APPLICATION NO. | : 12/600536 |
| DATED | : April 9, 2013 |
| INVENTOR(S) | : Alfons Schmidt et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,414,743 B2 | Page 1 of 1 |
| APPLICATION NO. | : 12/600536 | |
| DATED | : April 9, 2013 | |
| INVENTOR(S) | : Alfons Schmidt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

This certificate supersedes the Certificate of Correction issued May 20, 2014.

Signed and Sealed this
Twenty-second Day of July, 2014

Michelle K. Lee
*Deputy Director of the United States Patent and Trademark Office*